(12) United States Patent
Ogura

(10) Patent No.: US 11,961,255 B2
(45) Date of Patent: Apr. 16, 2024

(54) OBJECT DETECTION DEVICE AND OBJECT DETECTION COMPUTER PROGRAM

(71) Applicant: FANUC CORPORATION, Yamanashi (JP)

(72) Inventor: Shoutarou Ogura, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 874 days.

(21) Appl. No.: 16/989,774

(22) Filed: Aug. 10, 2020

(65) Prior Publication Data
US 2021/0056659 A1 Feb. 25, 2021

(30) Foreign Application Priority Data

Aug. 22, 2019 (JP) ................... 2019-151809

(51) Int. Cl.
*G06T 7/73* (2017.01)
*G06T 1/00* (2006.01)
(Continued)

(52) U.S. Cl.
CPC .............. *G06T 7/74* (2017.01); *G06T 1/0014* (2013.01); *G06T 7/001* (2013.01); *G06V 10/757* (2022.01);
(Continued)

(58) Field of Classification Search
CPC .... G06T 7/73; G06T 7/74; G06T 7/75; G06T 7/001; G06T 7/30; G06T 7/32;
(Continued)

(56) References Cited

U.S. PATENT DOCUMENTS

2004/0066964 A1* 4/2004 Neubauer .............. G06T 7/155
382/199
2010/0034484 A1* 2/2010 Kido ................... G06V 10/751
382/294
(Continued)

FOREIGN PATENT DOCUMENTS

JP 2004318488 A 11/2004
JP 2008-262307 A 10/2008
(Continued)

*Primary Examiner* — Vincent Rudolph
*Assistant Examiner* — Timothy Choi
(74) *Attorney, Agent, or Firm* — HAUPTMAN HAM, LLP

(57) ABSTRACT

The object detection device extracts a plurality of predetermined features from an image in which a target object is represented, calculates an entire coincidence degree between the plurality of predetermined features set for an entire model pattern of the target object and the plurality of predetermined features extracted from a corresponding region on the image while changing a relative positional relationship between the image and the model pattern, and calculates, for each partial region including a part of the model pattern, a partial coincidence degree between the predetermined features included in the partial region and the predetermined features extracted from a region corresponding to the partial region on the image. Then, the object detection device determines whether or not the target object is represented in the region on the image corresponding to the model pattern based on the entire coincidence degree and the partial coincidence degree.

8 Claims, 6 Drawing Sheets

(51) Int. Cl.
*G06T 7/00* (2017.01)
*G06V 10/74* (2022.01)
*G06V 10/75* (2022.01)
*G06V 20/52* (2022.01)

(52) U.S. Cl.
CPC ............ *G06V 10/761* (2022.01); *G06V 20/52* (2022.01); *G06T 7/73* (2017.01); *G06V 10/759* (2022.01)

(58) Field of Classification Search
CPC .......... G06T 7/33; G06T 7/337; G06T 7/344; G06T 7/37; G06T 2207/30152; G06T 2207/30164; G06V 10/751; G06V 10/7515; G06V 10/752; G06V 10/753; G06V 10/757; G06V 10/759; G06V 10/761; G06V 2201/06; G06F 18/22
See application file for complete search history.

(56) References Cited

U.S. PATENT DOCUMENTS

2014/0301648 A1* 10/2014 Kato ...................... G06F 18/28
382/199
2017/0148153 A1* 5/2017 Nakao ................... G06T 7/0004

FOREIGN PATENT DOCUMENTS

JP 2016-130979 A 7/2016
JP 201796749 A 6/2017

* cited by examiner

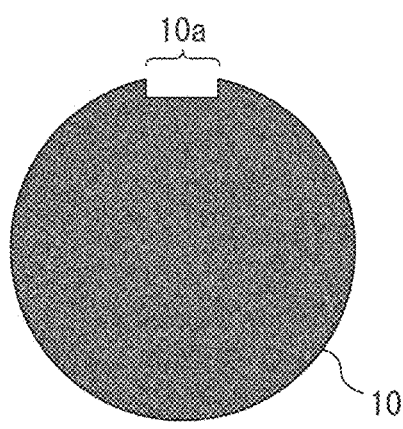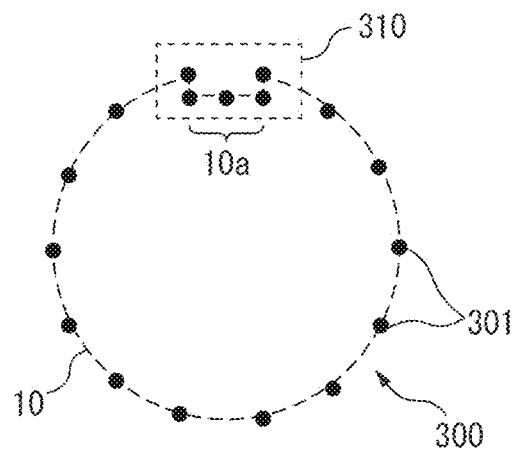

OBJECT DETECTION DEVICE AND OBJECT DETECTION COMPUTER PROGRAM

RELATED APPLICATIONS

The present application claims priority to Japanese Application Number 2019-151809, filed Aug. 22, 2019, the disclosure of which is hereby incorporated by reference herein in its entirety.

FIELD

The present invention relates to, for example, an object detection device and an object detection computer program that detect an object represented in an image.

BACKGROUND

A technique for detecting a region in which a target object is represented from an image in which the target object is represented has been conventionally proposed. Among such techniques, particularly, a technique for performing positioning with high accuracy on a target object having a shape in which a position and a posture are not accurately determined unless a specific portion is focused on since the target object has a highly symmetric shape, such as a wheel of a vehicle, has been proposed. For example, a positioning method described in Japanese Unexamined Patent Publication (Kokai) No. 2017-96749 sets a first region surrounding a standard pattern in a standard image of a product as a standard of an inspection target, and a second region that features a position and a posture of the standard pattern. Then, the positioning method roughly determines a position and a posture of the standard pattern in an inspection target image by searching the inspection target image for a feature extracted from the first region (first search step), and minutely determines at least one of the position and the posture, which are roughly determined, by searching the inspection target image for a feature extracted from the second region (second search step).

Further, a product inspection method described in Japanese Unexamined Patent Publication (Kokai) No. 2004-318488 sets, from an image in which a plurality of products are captured, an inspection window in which the individual product is represented when pattern matching is executed mutually between products included in an aggregate of the plurality of products. The product inspection method divides an inspection window in a reference position into a plurality of divided images each representing a characteristic pattern, and executes pattern matching between the inspection window and another inspection window by using, as a template, each of an entire image representing the entire inspection window in the reference position and the divided images. Then, the product inspection method determines whether a product is good or bad by comparing an entire model correlation value calculated by pattern matching on the entire image and a divided model correlation value calculated by pattern matching on the divided images with a threshold value.

SUMMARY

However, in the technique described in Japanese Unexamined Patent Publication (Kokai) No. 2017-96749, a user needs to set a search method in accordance with a shape of an inspection target in order to perform the second search step. For the setting of the search method, in the second search step, whether to perform a rotation search for searching an inspection target by rotating an inspection target image or to perform a linear search for searching an inspection target by shifting a position posture feature along a search direction in an inspection target image is designated, and a rotation center is set in a case of the rotation search and a search direction is set in a case of the linear search. When the setting of the search method is not appropriate, a set second region does not coincide with an inspection target image in which an inspection target is represented in the second search step, and therefore an appropriate positioning result cannot be acquired. Particularly, for the rotation center and the search direction, when there is even a slight error in the set rotation center or the set search direction, an angle and a position at which the second region and the inspection target image coincide with each other are not detected in the second search step, and an operator needs to set a search method with extra caution. Further, since the second search step is restricted to a search result in the first search step, a correct position and a correct posture of the inspection target cannot be determined unless the search result in the first search step itself is appropriate. Further, in the technique described in Japanese Unexamined Patent Publication (Kokai) No. 2004-318488, matching between inspection windows is executed after the individual inspection window is previously set for an image in which a product group is represented. Thus, in a case where the individual inspection window is not appropriately set in such a way as to represent a product when the inspection window is set, an appropriate good or bad determination result cannot be acquired even when pattern matching is executed on each of the entire window and each divided image.

In one aspect, it is an object to provide an object detection device that can detect a target object having symmetry represented in an image with high accuracy.

According to one embodiment, an object detection device is provided. The object detection device includes: a memory configured to store a model pattern representing a plurality of predetermined features of a target object located in positions different from each other when the target object is viewed from a predetermined direction, and at least one partial region including a part of the model pattern; and a processor configured to extract the plurality of predetermined features from an image in which the target object is represented, calculate an entire coincidence degree representing a coincidence degree between the plurality of predetermined features set for the entire model pattern and the plurality of predetermined features extracted from a region corresponding to the model pattern on the image while changing a relative positional relationship between the image and the model pattern, calculate, for each at least one partial region, a partial coincidence degree representing a coincidence degree between one or more features included in the partial region among the plurality of predetermined features set for the entire model pattern and one or more of the predetermined features extracted from a region corresponding to the partial region on the image while changing the relative positional relationship, and determine that the target object is represented in a region on the image corresponding to the model pattern when the entire coincidence degree is equal to or greater than a predetermined entire coincidence degree threshold value and the partial coincidence degree calculated for each at least one partial region is equal to or greater than a predetermined partial coincidence degree threshold value.

According to another embodiment, a non-transitory recording medium that stores an object detection computer program is provided. The object detection computer program includes an instruction causing a computer to execute: extracting a plurality of predetermined features from an image in which a target object is represented; calculating, while changing a relative positional relationship between the image and a model pattern representing the plurality of predetermined features of the target object located in positions different from each other when the target object is viewed from a predetermined direction, an entire coincidence degree representing a coincidence degree between the plurality of predetermined features set for the entire model pattern and the plurality of predetermined features extracted from a region corresponding to the model pattern on the image; calculating, while changing the relative positional relationship, for each at least one partial region including a part of the model pattern, a partial coincidence degree representing a coincidence degree between one or more of the predetermined features included in the partial region among the plurality of features set for the model pattern and one or more of the predetermined features extracted from a region corresponding to the partial region on the image, and determining that the target object is represented in a region on the image corresponding to the model pattern when the entire coincidence degree is equal to or greater than a predetermined entire coincidence degree threshold value and the partial coincidence degree calculated for each at least one partial region is equal to or greater than a predetermined partial coincidence degree threshold value.

According to one aspect, a target object having symmetry represented in an image can be detected with high accuracy.

BRIEF DESCRIPTION OF DRAWINGS

FIG. 3A is a diagram illustrating one example of a shape of a workpiece when viewed from a predetermined direction.

FIG. 3B is a diagram illustrating one example of a model pattern of the workpiece.

DESCRIPTION OF EMBODIMENTS

An object detection device according to an embodiment of the present invention will be described below with reference to the drawings. The object detection device detects, for example, an object as a search target (hereinafter, simply referred to as a target object) from an image in which the target object is represented and is generated by capturing the target object by an image capturing unit. At this time, the object detection device calculates an entire coincidence degree representing a coincidence degree between a plurality of features set for an entire model pattern representing an appearance when the target object is viewed from a predetermined direction, and a plurality of features extracted from a comparison region corresponding to the model pattern on the image while changing a relative positional relationship between the image and the model pattern. Furthermore, the object detection device calculates, for each of at least one partial region representing a part of the model pattern, a partial coincidence degree representing a coincidence degree between one or more features included in the partial region and one or more features extracted from a partial comparison region on the image corresponding to the partial region. Then, when the entire coincidence degree and the partial coincidence degree calculated for each partial region are equal to or greater than a threshold value, the object detection device determines that the target object is represented in the comparison region on the image corresponding to the model pattern.

An example in which the object detection device is incorporated in a robot system will be described below. In this example, the image capturing unit attached to a movable member included in a robot captures, as a target object, a workpiece that is a work target of an automatic machine, thereby generating an image in which the target object is represented. Then, a control device of the robot in which the object detection device is incorporated detects the target object from the image, and controls the movable member on the basis of the detection result.

Figure 1:
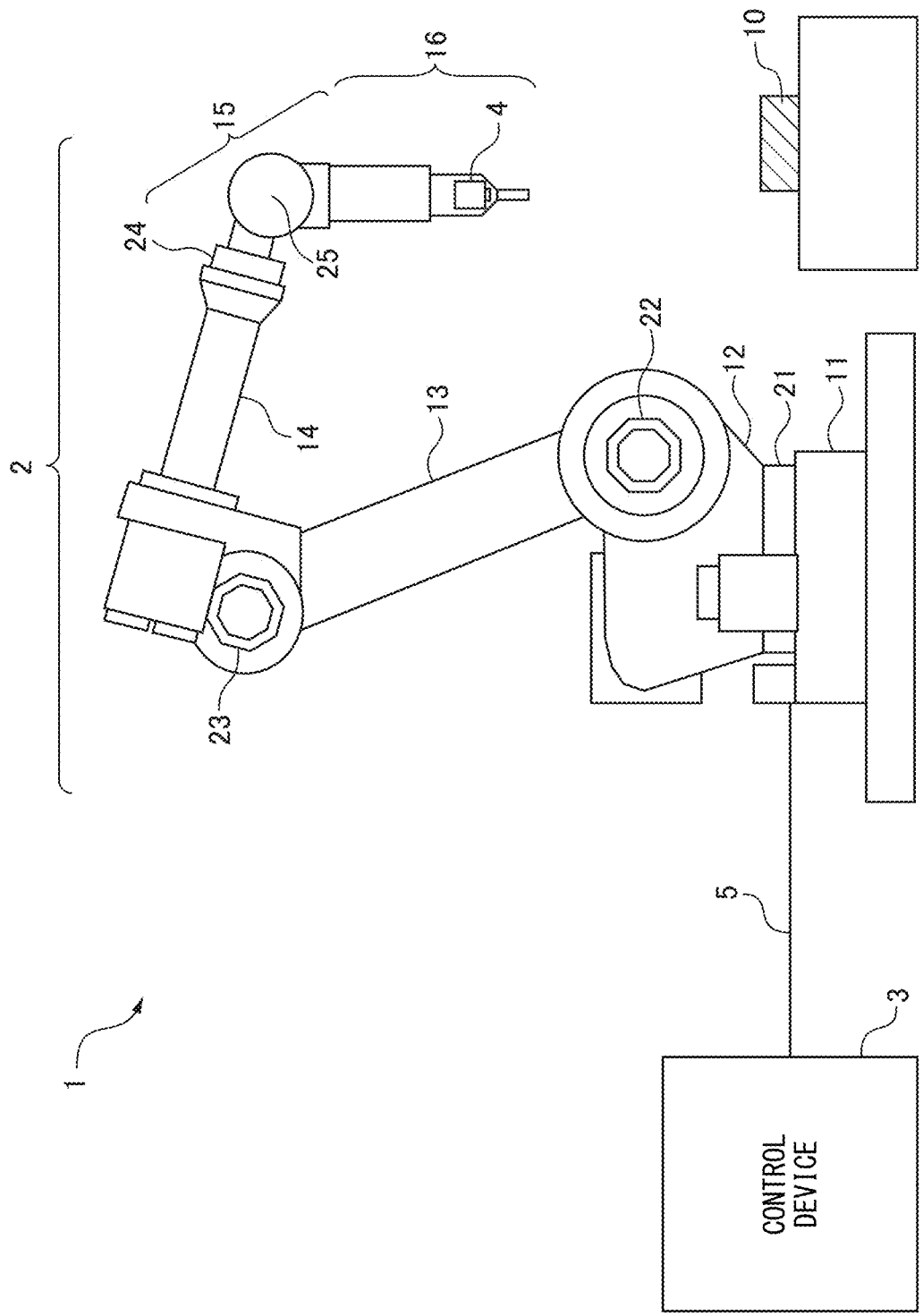
FIG. 1 is a schematic configuration diagram of a robot system according to one embodiment.

FIG. 1 is a schematic configuration diagram of a robot system 1 on which an object detection device is mounted according to one embodiment. The robot system 1 includes a robot 2, a control device 3 that controls the robot 2, and a camera 4 that is attached to a movable member of the robot 2 and is used for capturing a workpiece 10, which is one example of a target object. The robot system 1 is one example of an automatic machine.

The robot 2 includes a base 11, a rotary stage 12, a first arm 13, a second arm 14, a wrist 15, and a tool 16. Each of the rotary stage 12, the first arm 13, the second arm 14, the wrist 15, and the tool 16 is one example of a movable member. Each of the rotary stage 12, the first arm 13, the second arm 14, and the wrist 15 is supported by a shaft provided in a joint to which each of the rotary stage 12, the first arm 13, the second arm 14, and the wrist 15 is attached, and operates by driving the shaft by a servomotor. Further, the workpiece 10 is transported by a belt conveyor, for example, and the robot 2 performs predetermined work on the workpiece 10 while the workpiece 10 is located within a predetermined range.

The base 11 is a member serving as a pedestal when the robot 2 is installed on a floor. The rotary stage 12 is rotatably attached to a top surface of the base 11 at a joint 21 by means of, as a rotation center, a shaft (not illustrated) perpendicular to the top surface of the base 11.

The first arm 13 is attached, at one end thereof, to the rotary stage 12 at a joint 22 provided on the rotary stage 12. In the present embodiment, as illustrated in FIG. 1, the first arm 13 is rotatable about a shaft (not illustrated) provided on the joint 22 in parallel with the surface of the base 11 to which the rotary stage 12 is attached.

The second arm 14 is attached, on one end side thereof, to the first arm 13 at a joint 23 provided on the other end side of the first arm 13 opposite to the joint 22. In the present embodiment, as illustrated in FIG. 1, the second arm 14 is rotatable about a shaft (not illustrated) provided on the joint 23 in parallel with the surface of the base 11 to which the rotary stage 12 is attached.

The wrist 15 is attached, via a joint 24, to a tip of the second arm 14 opposite to the joint 23. The wrist 15 includes a joint 25, and can be bent with, as a rotation center, a shaft (not illustrated) provided in the joint 25 in parallel with the shaft of the joint 22 and the shaft of the joint 23. Furthermore, the wrist 15 may be rotatable in a surface orthogonal to a longitudinal direction of the second arm 14 with, as a rotation center, a shaft (not illustrated) parallel to the longitudinal direction of the second arm 14.

The tool 16 is attached to a tip of the wrist 15 opposite to the joint 24. The tool 16 includes a mechanism or a device for performing work on the workpiece 10. For example, the tool 16 may include a laser for processing the workpiece 10, or may include a servo gun for welding the workpiece 10. Alternatively, the tool 16 may include a hand mechanism for holding the workpiece 10 or a part assembled to the workpiece 10.

The camera 4 is one example of an image capturing unit, and is attached to the tool 16, for example. The camera 4 may be attached to another movable member such as the wrist 15 or the second arm 14. When the robot 2 performs work on the workpiece 10, the camera 4 is directed in such a way that the workpiece 10 is included in an image capturing range of the camera 4. Then, the camera 4 generates an image on which the workpiece 10 is represented by capturing the image capturing range including the workpiece 10 at each predetermined image capturing period. Every time the camera 4 generates an image, the camera 4 outputs the generated image to the control device 3 via a communication line 5.

The control device 3 is connected to the robot 2 via the communication line 5, and receives information indicating an operational status of the servomotor that drives the shaft provided in each of the joints of the robot 2, an image from the camera 4, and the like from the robot 2 via the communication line 5. Then, the control device 3 controls the servomotor, on the basis of the received information, the received image, and an operation of the robot 2 being received from a host control device (not illustrated) or being previously set, and thereby controls a position and a posture of each of the movable members of the robot 2.

Figure 2:
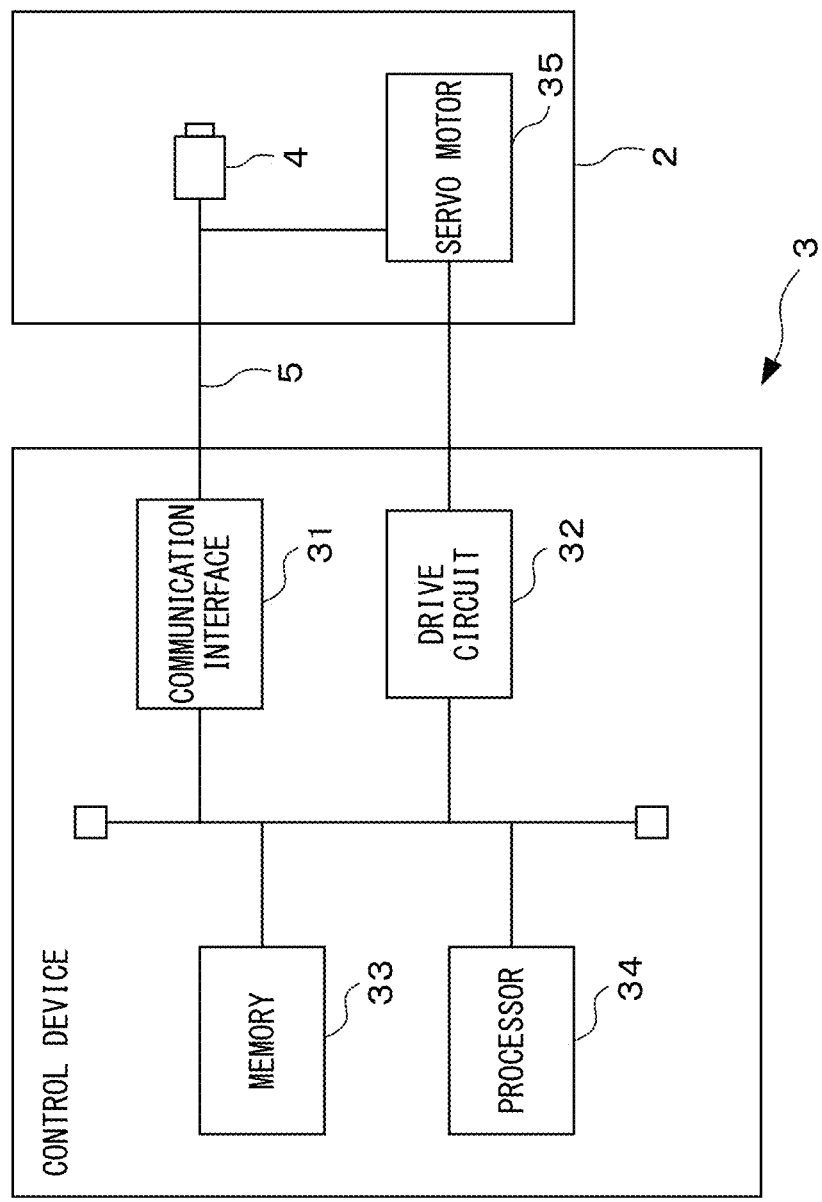
FIG. 2 is a schematic configuration diagram of a control device.

FIG. 2 is a schematic configuration diagram of the control device 3. The control device 3 includes a communication interface 31, a drive circuit 32, a memory 33, and a processor 34. Furthermore, the control device 3 may include a user interface (not illustrated) such as a touch panel.

The communication interface 31 includes, for example, a communication interface for connecting the control device 3 to the communication line 5, a circuit for executing processing related to transmission and reception of a signal via the communication line 5, and the like. Then, the communication interface 31 receives information indicating an operational status of a servomotor 35 as one example of a drive unit, such as a measurement value of an amount of rotation of the servomotor 35 from an encoder for detecting the amount of rotation, from the robot 2 via the communication line 5, and passes the information to the processor 34. Note that FIG. 2 illustrates one servomotor 35 representatively, but the robot 2 may include, for each joint, a servomotor that drives a shaft of the joint. Furthermore, the communication interface 31 receives an image from the camera 4, and passes the received image to the processor 34.

The drive circuit 32 is connected to the servomotor 35 via a current supply cable, and supplies electric power corresponding to torque generated by the servomotor 35, a rotation direction, or a rotation speed of the servomotor 35 in accordance with control by the processor 34.

The memory 33 is an example of a storage unit, and includes, for example, a readable-writable semiconductor memory and a read-only semiconductor memory. Furthermore, the memory 33 may include a storage medium such as a semiconductor memory card, a hard disk, or an optical storage medium, and a device that accesses the storage medium.

The memory 33 stores various computer programs for controlling the robot 2 that are executed in the processor 34 of the control device 3, and the like. Further, the memory 33 stores information for controlling an operation of the robot 2 when the robot 2 is operated. Furthermore, the memory 33 stores information indicating an operational status of the servomotor 35 acquired from the robot 2 during operation of the robot 2. Further, the memory 33 stores various pieces of data used in object detection processing. Such data include, for example, a model pattern of the workpiece 10, which is used for detecting the workpiece 10, a camera parameter indicating information related to the camera 4, such as a focal distance, an attached position, and an orientation of the camera 4, and an image acquired from the camera 4.

In the present embodiment, a model pattern represents a plurality of predetermined features of the workpiece 10 located in positions different from each other when viewed from a predetermined direction of (for example, from vertically above) the workpiece 10. Furthermore, at least one partial region is set in the model pattern in such a way as to include a part of the workpiece 10. The partial region is set to, for example, a local portion representing a posture of the workpiece 10 (for example, a portion whose position and posture change with respect to a reference point of the workpiece 10 (for example, the centroid of a region in which the workpiece 10 is represented when viewed from the predetermined direction) according to the posture of the workpiece 10 when viewed from the predetermined direction of the workpiece 10. Note that the partial region is not limited to one, and a plurality of partial regions may be set. Further, the workpiece 10 may have, for example, a shape having symmetry when viewed from the predetermined direction (for example, a shape having line symmetry). Furthermore, a predetermined feature represented in the model pattern can be a feature point representing a contour of some sort of portion of the workpiece 10 such as a point on a contour of an appearance of the workpiece 10 or a point along a hole formed in the workpiece 10, for example. Alternatively, the predetermined feature may be a straight line or a curved line located on a specific portion of the workpiece 10, or a shape representing a shape of a specific portion of the workpiece 10 (such as a triangle or a circle, for example).

FIG. 3A is a diagram illustrating one example of a shape of the workpiece 10 when viewed from a predetermined direction. FIG. 3B is a diagram illustrating one example of a model pattern of the workpiece 10. As illustrated in FIG. 3A, in the example, the workpiece 10 when viewed from the predetermined direction has a shape with line symmetry having a substantially circular contour and having a part 10*a* of the contour missing in a recessed shape. In contrast, as illustrated in FIG. 3B, a plurality of points 301 on the contour of the workpiece 10 are each set as a feature in a model pattern 300. For example, the plurality of features 301 are detected by executing processing of a feature extraction unit 41 of a processor 34 described later on a reference image generated by capturing the workpiece 10 from the predetermined direction. Further, in the model pattern 300, a partial region 310 is set for the part 10*a* missing in the recessed shape in the contour of the workpiece 10. The partial region 310 is set in such a way as to include a portion whose position and posture change relatively to the centroid of a region in which the workpiece 10 is represented according to a posture of the workpiece 10. Thus, by comparing not only the entire model pattern 300 but also the partial region 310 with an image in which the workpiece 10 is represented, a position and a posture of the workpiece 10 on the image can be accurately detected. Note that, for example, an operator may set the partial region while visually recognizing the reference image described above. Further, the model pattern 300 is represented by, for example, a binary image in which a pixel in which each feature is located and the other pixel have different values.

The processor 34 is one example of a control unit, and includes, for example, a central processing unit (CPU) and a peripheral circuit of the CPU. Furthermore, the processor 34 may include a processor for an arithmetic operation. Then, the processor 34 controls the entirety of the robot system 1. Further, the processor 34 executes movable member control processing including the object detection processing.

Figure 4:
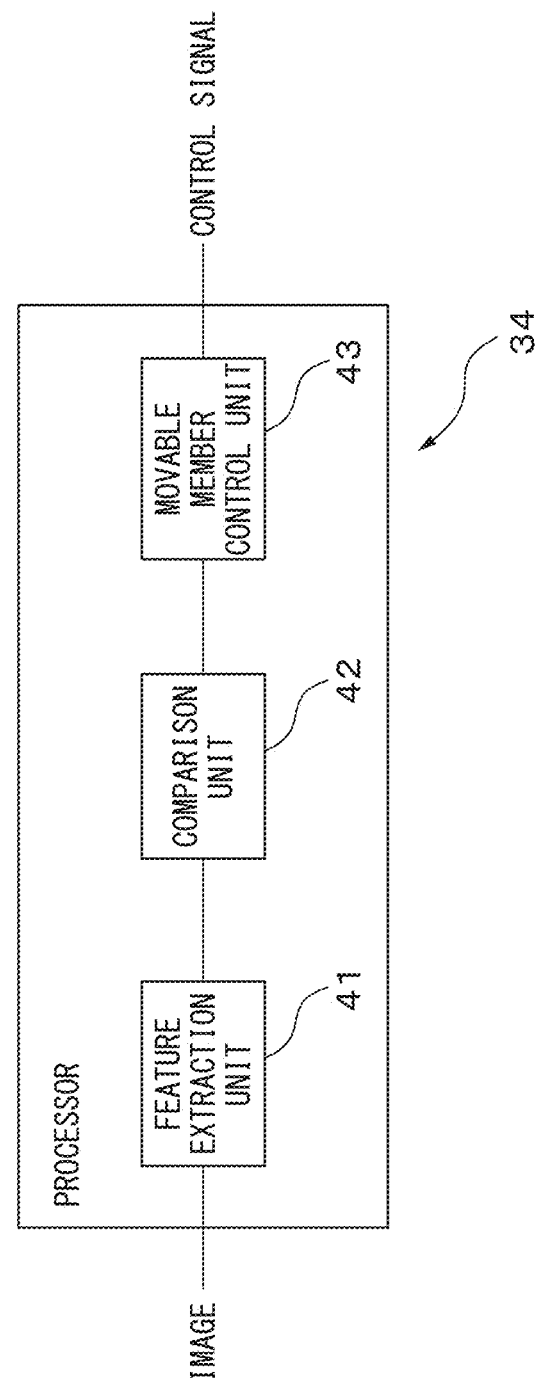
FIG. 4 is a functional block diagram of a processor included in the control device in relation to movable member control processing including object detection processing.

FIG. 4 is a functional block diagram of the processor 34 in relation to the movable member control processing including the object detection processing. The processor 34 includes the feature extraction unit 41, a comparison unit 42, and a movable member control unit 43. Each of these units included in the processor 34 is, for example, a functional module implemented by a computer program executed on the processor 34. Alternatively, each of these units may be implemented as a dedicated arithmetic circuit mounted on a part of the processor 34. Further, processing by the feature extraction unit 41 and the comparison unit 42 of each of these units included in the processor 34 is included in the object detection processing.

The feature extraction unit 41 extracts a plurality of features of the same type as that represented in the model pattern from each time-series of images generated by the camera 4. Since the feature extraction unit 41 may execute the same processing on each image, processing on one image will be described below.

When a feature is a feature point that is a point located on a contour of the workpiece 10, for example, the feature extraction unit 41 applies an edge detection filter such as a Sobel filter to each pixel on an image and extracts, as a feature, a pixel having edge intensity equal to or greater than a predetermined value. Alternatively, the feature extraction unit 41 may extract, as a feature, a pixel representing a corner detected by applying a corner detection filter such as Harris to an image. Still alternatively, the feature extraction unit 41 may extract, as a feature, a pixel detected by applying a SIFT algorithm to an image.

Further, when a feature is a straight line, for example, by extracting a plurality of feature points from an image as described above and executing Hough transform on the plurality of extracted feature points, the feature extraction unit 41 may extract, as a feature, each straight line in which a predetermined number or more of feature points are aligned. Similarly, when a feature is a predetermined curved line (for example, a quadratic curve such as a circular arc, a cubic curve or a higher-order curve), for example, the feature extraction unit 41 extracts a plurality of feature points from an image as described above, and executes generalized Hough transform on the plurality of extracted feature points. In this way, the feature extraction unit 41 may extract, as a feature, each predetermined curved line in which a predetermined number or more of feature points are aligned.

Still alternatively, when a feature is a figure having a predetermined shape (for example, a triangle or a circle), by executing template matching between a template representing the figure and an image, the feature extraction unit 41 may extract, as a feature, each figure having the predetermined shape from the image. Alternatively, the feature extraction unit 41 may extract a figure having a predetermined shape by inputting an image to a classifier such as a convolutional neural network being previously trained in such a way as to detect the figure.

The feature extraction unit 41 notifies, for each image, the comparison unit 42 of a position of each feature extracted from the image. For example, the feature extraction unit 41 generates, as data representing a position of each feature, a binary image in which a pixel representing an extracted feature and the other pixel have different values, and passes the generated binary image to the comparison unit 42.

The comparison unit 42 detects, for each time-series of images generated by the camera 4, the workpiece 10 from the image by comparing a plurality of features extracted from the image with a model pattern. Note that, since the comparison unit 42 may execute the same processing on each image, processing on one image will be described below.

For example, the comparison unit 42 reads a model pattern from the memory 33 and compares the model pattern with an image of interest, and thereby detects a region in which the workpiece 10 is represented on the image. For this purpose, the comparison unit 42 sets a plurality of comparison regions compared with the model pattern on the image by changing a relative positional relationship of the model pattern with the image. Note that a change in the relative positional relationship is made by changing at least one of a relative position, a relative orientation, and a scale of the model pattern with the image, for example. Such a change is made by applying an affine transformation to a model pattern, for example. Then, the comparison unit 42 calculates, for each comparison region between the comparison region and the model pattern, an entire coincidence degree representing a coincidence degree between a plurality of features set for the entire model pattern and a plurality of features extracted from the comparison region. Furthermore, the comparison unit 42 calculates, for each comparison region, a partial coincidence degree representing a coincidence degree between one or more features included in a partial region set in the model pattern and one or more features extracted from a partial comparison region on the image corresponding to the partial region. Note that, when a plurality of partial regions are set for the model pattern, the comparison unit 42 may calculate a partial coincidence degree for each of the plurality of partial regions.

The comparison unit 42 can calculate an entire coincidence degree and a partial coincidence degree according to the following equation, for example.

Entire coincidence degree=the number of features whose distance to any of features extracted from a comparison region of a target image is equal to or less than a predetermined value, among features set for the model pattern/the total number of the features set for the model pattern Partial coincidence degree=the number of features whose distance to any of features extracted from a partial comparison region of the target image corresponding to the partial region of the model pattern is equal to or less than a predetermined value, among features set for the partial region/the total number of the features included in the partial region Note that, when an individual feature is represented by a point such as a point on a contour (i.e., when an individual feature is a feature point), a distance between two features in the calculation equations of the entire coincidence degree and the partial coincidence degree described above can be a Euclidean distance between feature points. Further, when an individual feature is a straight line or a curved line, a distance between two features can be an average value of Euclidean distances between a plurality of predetermined positions (for example, both end points and a middle point) in two straight lines or two curved lines as features. Furthermore, when an individual feature is a figure having a predetermined shape such as a triangle or a circle, a distance between two features can be an average value of Euclidean distances between a plurality of predetermined positions (for example, the centroid of a shape, any of corners, or the like) in two shapes as features.

Alternatively, the comparison unit 42 may calculate, for an individual feature of a model pattern, an entire coincidence degree and a partial coincidence degree according to the following equation, for example, in such a way as to increase the entire coincidence degree and the partial coincidence degree as a distance to the closest feature in a comparison region is closer.

Entire coincidence degree=$\Sigma_{n=1}^{N}(1/(dn+1))/N$

Partial coincidence degree=$\Sigma_{m=1}^{M}(1/(dm+1))/M$

Note that dn is a minimum value among distances to any of features extracted from a comparison region of a target image from an n-th feature set for a model pattern, and N represents the total number of features set for the model pattern. Similarly, dm is a minimum value among distances to any of features extracted from a partial comparison region of the target image corresponding to a partial region from an m-th feature set for the partial region of the model pattern, and M represents the total number of features included in the partial region of the model pattern.

When, for a comparison region of interest, the entire coincidence degree is equal to or greater than a predetermined entire coincidence degree threshold value and the partial coincidence degree calculated for each partial region is equal to or greater than a predetermined partial coincidence degree threshold value, the comparison unit 42 determines that the workpiece 10 is represented in the comparison region of interest.

Figure 5A:
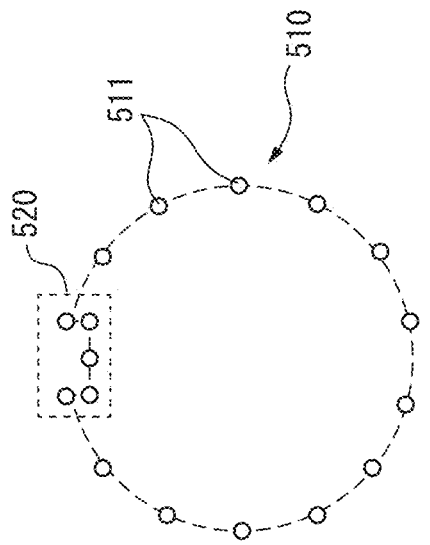
FIGS. 5A to 5E are each a schematic explanatory diagram of comparison between a model pattern and an image.
Figure 5B:
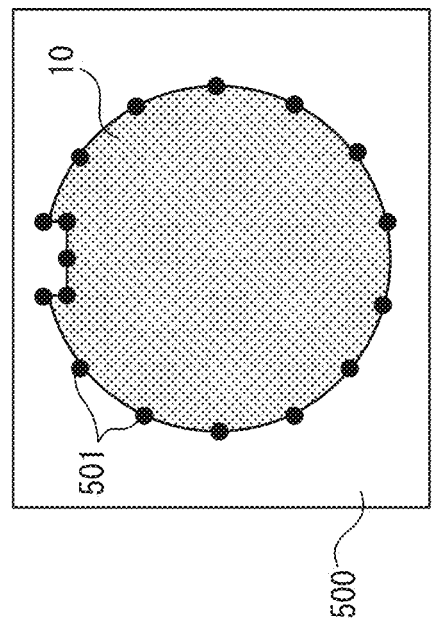

FIGS. 5A to 5E are diagrams schematically illustrating comparison between a model pattern and an image. As illustrated in FIG. 5A, the workpiece 10 represented in an image 500 has a shape having a substantially circular contour and having a part of the contour missing in a recessed shape. Then, a plurality of features 501 are extracted along the contour of the workpiece 10. In contrast, as illustrated in FIG. 5B, a plurality of features 511 are set along the contour of the workpiece 10 in a model pattern 510, and a partial region 520 is set for a portion having the contour missing in a recessed shape.

Figure 5C:
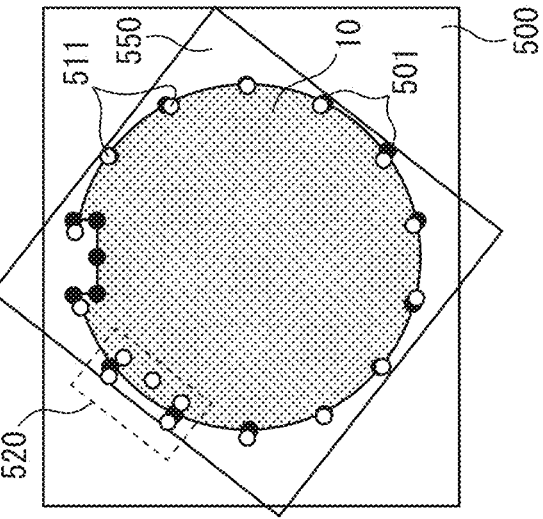

As illustrated in FIG. 5C, it is assumed that a comparison region 530 is set in the image 500 in such a way as to include the workpiece 10, and an orientation of the model pattern 510 coincides with an orientation of the workpiece 10 on the image 500. In this case, the individual feature 501 extracted from the image 500 substantially coincides with the individual feature 511 set for the model pattern 510 in not only the entire model pattern 510 but also in the partial region 520. Thus, since both of an entire coincidence degree and a partial coincidence degree have a high value, it is determined that the workpiece 10 is represented in the comparison region 530, and it is clear that the orientation of the workpiece 10 on the image 500 is the same orientation as that of the model pattern 510.

Figure 5D:
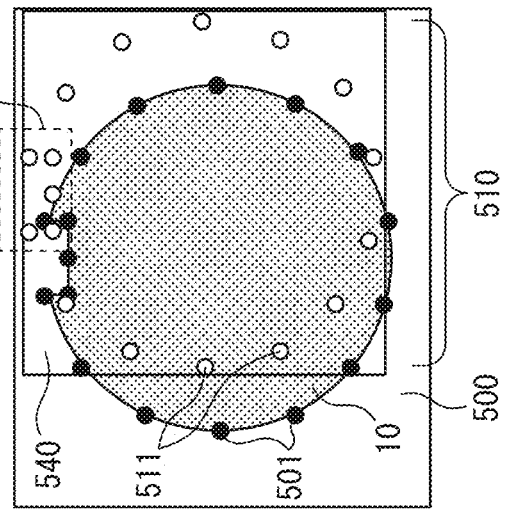

On the other hand, as illustrated in FIG. 5D, when a comparison region 540 is offset with respect to the region in which the workpiece 10 is represented, the individual feature 501 extracted from the image 500 does not coincide, in the entire comparison region, with the individual feature 511 set for the model pattern 510. Furthermore, the individual feature 501 extracted from the image 500 does not coincide, in the partial region 520, with the individual feature 511 set for the model pattern 510. As a result, both of the entire coincidence degree and the partial coincidence degree have a low value. Thus, it is determined that the comparison region 540 is different from the region in which the workpiece 10 is represented.

Figure 5E:
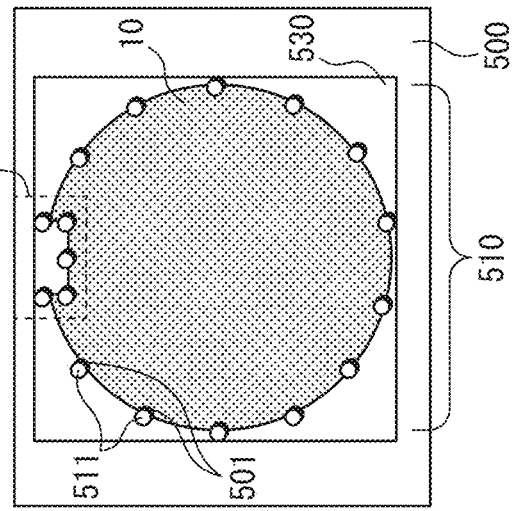

Furthermore, as illustrated in FIG. 5E, it is assumed that a comparison region 550 is set in such a way that the workpiece 10 is included but an orientation of the workpiece 10 on the image 500 is different from an orientation of the compared model pattern 510. In this case, since the model pattern 510 is positioned in such a way as to substantially coincide with the contour of the workpiece 10, many features of the plurality of features 501 are at a close distance to any of the features 511, and therefore the entire coincidence degree has a relatively high value. However, a position of the portion of the workpiece 10 missing in the recessed shape is offset with respect to a position of the partial region 520 of the model pattern 510, and thus the partial coincidence degree has a low value. As a result, the workpiece 10 is not detected from the comparison region 550.

In such a manner, the comparison unit 42 detects the region in which the workpiece 10 is represented on the image, on the basis of both of the entire coincidence degree calculated from the entire model pattern and the partial coincidence degree calculated for the partial region, and can thus detect not only a position of the workpiece 10 represented in the image but also a posture of the workpiece 10.

Note that the entire coincidence degree threshold value and the partial coincidence degree threshold value may be the same or may be different from each other.

For example, some sort of shadow is casted on a part of the workpiece 10 depending on a positional relationship between the camera 4 and the workpiece 10, and the feature extraction unit 41 may not be able to sufficiently extract a feature from the part on which the shadow is casted. In such a case, there is a risk that the entire coincidence degree may have a relatively low value. Thus, it is preferable to set the entire coincidence degree threshold value and the partial coincidence degree threshold value in such a way that the partial coincidence degree threshold value is higher than the entire coincidence degree threshold value. In this way, the workpiece 10 can be detected even when a coincidence degree with regard to the entire coincidence degree is relatively low, and a relatively high coincidence degree with regard to the partial coincidence degree is required to detect the workpiece 10. Thus, the comparison unit 42 can suppress failure of detection of the workpiece 10 while suppressing false detection of the other object as the workpiece 10. Furthermore, even when a part of the workpiece 10 has a unique shape and a partial region is set in such a way as to include the unique shape, it is preferable to set the entire coincidence degree threshold value and the partial coincidence degree threshold value in such a way that the partial coincidence degree threshold value is higher than the entire coincidence degree threshold value. In this way, the comparison unit 42 can detect the workpiece 10 including the unique shape with more high accuracy.

Further, when the workpiece 10 is previously processed, a portion having an indefinite shape may be included in a part of the workpiece 10 as in a case where a hole having an indefinite shape is formed in the workpiece 10, and a partial region may be set in such a way as to include the portion having the indefinite shape. In such a case, a position of a feature in the partial region of a model pattern does not necessarily coincide with a position of a feature in a region corresponding to the actual workpiece, and, as a result, the partial coincidence degree is lower than the entire coincidence degree even when the workpiece 10 is represented in a comparison region of interest. Thus, in such a case, it is preferable to set the entire coincidence degree threshold value and the partial coincidence degree threshold value in such a way that the entire coincidence degree threshold value is higher than the partial coincidence degree threshold value. In this way, even when a portion having an indefinite shape is included in a part of the workpiece 10, the comparison unit 42 can detect a posture of the workpiece 10 represented in an image by using a feature of the portion having the indefinite shape.

Further, when a plurality of partial regions are set in a model pattern, a value of the partial coincidence degree threshold value applied to each of the partial regions may be different from each other, or a value of the partial coincidence degree threshold value applied to each of the partial regions may be the same.

Note that a plurality of model patterns may be previously prepared. In this case, each of the model patterns may vary in a direction in which the workpiece 10 is viewed. In this case, the comparison unit 42 calculates, for each of the plurality of model patterns, an entire coincidence degree and a partial coincidence degree for each comparison region similarly to the description above. Then, the comparison unit 42 may determine that the workpiece 10 viewed from a direction represented in the model pattern is represented in a comparison region corresponding to a position of the model pattern in which a sum of the entire coincidence degree and the partial coincidence degree is maximum, the entire coincidence degree is equal to or greater than the entire coincidence degree threshold value, and the partial coincidence degree is equal to or greater than the partial coincidence degree threshold value.

When a position of the workpiece 10 on the image is determined, the comparison unit 42 detects a position of the workpiece 10 in a real space, on the basis of the position. Herein, a position of each pixel on the image has a one-to-one correspondence with a bearing when viewed from the camera 4. Thus, the comparison unit 42 can determine, for example, a bearing corresponding to the centroid of the region in which the workpiece 10 is represented on the image as a bearing from the camera 4 toward the workpiece 10. Furthermore, the comparison unit 42 can calculate an estimated distance from the camera 4 to the workpiece 10 by multiplying a predetermined reference distance by a ratio of an area of the workpiece 10 on the image when a distance from the camera 4 to the workpiece 10 is the reference distance to an area of the region in which the workpiece 10 is represented on the image. Therefore, the comparison unit 42 can detect a position of the workpiece 10 in a camera coordinate system with reference to a position of the camera 4, on the basis of the bearing from the camera 4 toward the workpiece 10 and the estimated distance.

Furthermore, the comparison unit 42 can calculate an actual amount of rotation of the workpiece 10 with respect to an orientation of the workpiece 10 represented in the model pattern when viewed from a predetermined direction, on the basis of an orientation of the model pattern in the comparison region determined that the workpiece 10 is represented. Thus, the comparison unit 42 can determine a posture of the workpiece 10 on the basis of the amount of rotation. Furthermore, the comparison unit 42 can determine a posture of the workpiece 10 indicated in the camera coordinate system by rotating the posture of the workpiece 10 on the image by a difference between a predetermined direction defined for the model pattern and a bearing from the camera 4 corresponding to the centroid of the region in which the workpiece 10 is represented.

Every time the comparison unit 42 determines a position of the workpiece 10 in a real space, the comparison unit 42 outputs the position of the workpiece 10 to the movable member control unit 43.

The movable member control unit 43 controls the movable member of the robot 2, on the basis of the position and the posture of the workpiece 10 detected by the comparison unit 42. For example, the movable member control unit 43 controls each of the movable members of the robot 2 in such a way that the tool 16 of the robot 2 moves to a position in which the tool 16 can perform work on the workpiece 10. For this purpose, for example, the movable member control unit 43 controls each of the movable members of the robot 2 in such a way that the workpiece 10 is represented in an image generated by the camera 4 at a predetermined position and a predetermined size corresponding to a position in which the tool 16 performs work on the workpiece 10. In this case, the movable member control unit 43 may control each of the movable members of the robot 2 in accordance with a technique for controlling a robot on the basis of an image of a target object generated by a camera, such as a position-based method or a feature-based method, for example. For such a technique, see Hashimoto, "Vision and Control", The Society of Instrument and Control Engineers, Control Division Convention Workshop, Kyoto, pp. 37 to 68, 2001, for example.

Figure 6:
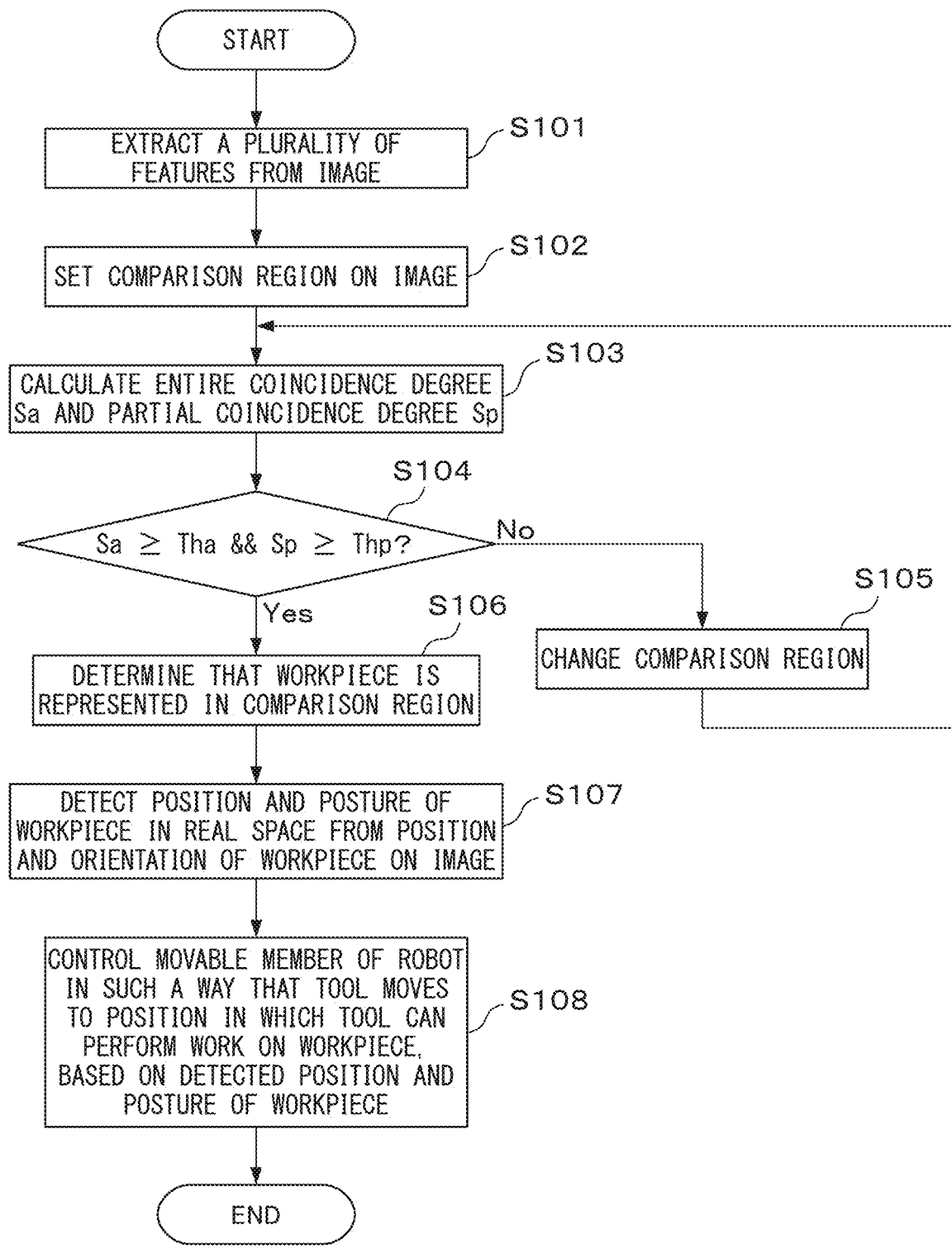
FIG. 6 is an operation flowchart of the movable member control processing including the object detection processing.

FIG. 6 is an operation flowchart of the movable member control processing including the object detection processing. The processor 34 executes the movable member control processing every time an image is acquired from the camera 4 in accordance with the operation flowchart described below. Note that processing in steps S101 to S107 in the following operation flowchart is included in the object detection processing.

The feature extraction unit 41 extracts, from an image, a plurality of features of an appearance of the workpiece 10 in positions different from each other (step S101). The comparison unit 42 sets, on the image, a comparison region compared with a model pattern (step S102). The comparison unit 42 calculates an entire coincidence degree Sa, and calculates a partial coincidence degree Sp for each partial region between the model pattern and the comparison region (step S103). Then, the comparison unit 42 determines whether or not the entire coincidence degree Sa is equal to or greater than an entire coincidence degree threshold value Tha, and determines whether or not the partial coincidence degree Sp is equal to or greater than a partial coincidence degree threshold value Thp for each partial region (step S104).

When the entire coincidence degree is less than the entire coincidence degree threshold value Tha, or the partial coincidence degree is less than the partial coincidence degree threshold value Thp for any of the partial regions (step S104-No), the comparison unit 42 determines that the workpiece 10 at the same orientation as the orientation of the model pattern is not represented in the comparison region.

Then, the comparison unit 42 changes the comparison region by changing at least any of a relative position, a relative orientation, and a scale of a model pattern with respect to the image (step S105). Subsequently, the comparison unit 42 repeats the processing in and after step S103.

On the other hand, when the entire coincidence degree is equal to or greater than the entire coincidence degree threshold value Tha, and the partial coincidence degree is equal to or greater than the partial coincidence degree threshold value Thp for each partial region (step S104-Yes), the comparison unit 42 determines that the workpiece 10 at the same orientation as the orientation of the compared model pattern is represented in the comparison region (step S106). Then, the comparison unit 42 detects a position and a posture of the workpiece 10 in a real space from the position and the orientation of the workpiece 10 on the image (step S107).

The movable member control unit 43 controls the movable member of the robot 2 in such a way that the tool 16 moves to a position in which the tool 16 can perform work on the workpiece 10, on the basis of the position and the posture of the workpiece 10 in the real space (step S108).

After step S108, the processor 34 finishes the movable member control processing. Note that, in a case where the workpiece 10 is not detected on an image even when the comparison unit 42 repeats the processing in steps S103 to S105 for the predetermined number of times or more, the comparison unit 42 may determine that the workpiece 10 is not represented in the image. In this case, the movable member control unit 43 may stop the movable member.

As described above, the object detection device calculates, for each of a plurality of comparison regions on an image, an entire coincidence degree between a plurality of features set for an entire model pattern representing a target object, and a plurality of features extracted from the comparison region. Furthermore, in each comparison region, the object detection device calculates, for each of at least one partial region representing a part of the model pattern, a partial coincidence degree between one or more features included in the partial region and one or more features extracted from a partial comparison region on the target image corresponding to the partial region. Then, the object detection device determines that the target object is represented in the comparison region in which the entire coincidence degree and the partial coincidence degree for each partial region are equal to or greater than a threshold value. Thus, even when the other object having an entire shape similar to that of the target object is represented on the image, the object detection device can suppress false detection of the other object as the target object. Furthermore, since the object detection device uses the partial coincidence degree for one or more partial regions set in the model pattern to detect the target object, the object detection device can accurately detect an orientation of the target object represented on the image based on an orientation of the model pattern compared with the image. Thus, the object detection device can also detect a posture of the target object. As described above, the object detection device can detect the target object represented in the image with high accuracy. Particularly, even when the target object has symmetry, the object detection device can detect the target object from the image with high accuracy by executing the processing described above.

According to a modified example, a type of a feature used for calculating a partial coincidence degree may be different from a type of a feature used for calculating an entire coincidence degree. For example, the feature used for calculating the entire coincidence degree may be a point on a contour of a detection target (i.e., feature point), and on the other hand, the feature used for calculating the partial coincidence degree may be a shape, a straight line, or a curved line representing a characteristic portion of the detection target. Furthermore, when a plurality of partial regions are set in a model pattern, a type of the feature used for calculating the partial coincidence degree may be different for each of the partial regions.

In this case, the feature extraction unit 41 extracts, from an image, not only a feature of a type used for calculating the entire coincidence degree (i.e., second type) but also a feature of a type used for calculating the partial coincidence degree (i.e., first type). Then, the comparison unit 42 may calculate the entire coincidence degree, on the basis of a coincidence degree between features of the second type, and calculate the partial coincidence degree, on the basis of a coincidence degree between features of the first type. Note that a calculation equation of the entire coincidence degree and a calculation equation of the partial coincidence degree may be the same as the calculation equations used in the embodiment described above.

In such a manner, by using features of different types for comparing the entire model pattern and comparing a part of the model pattern, the comparison unit 42 can use a feature suitable for comparing the entire model pattern (for example, a feature point) and a feature suitable for comparing the part of the model pattern (for example, a shape, a straight line, or a curved line). Thus, the object detection device can further improve detection accuracy of a target object.

Further, the comparison unit 42 may automatically set a search pattern of a partial comparison region for calculating a partial coincidence degree in accordance with a calculation result of an entire coincidence degree. For example, the comparison unit 42 may set closer partial comparison regions as an entire coincidence degree decreases. In this way, the object detection device can detect a target object with high accuracy without setting a search method by a user.

Further, the object detection device may be used for a purpose other than control of an automatic machine. For example, the object detection device may be used for determining whether the workpiece 10 transported on a belt conveyor is good or bad. In this case, for example, the camera 4 may be fixedly attached in such a way that a part of a transport path of the workpiece 10 is included in an image capturing range of the camera 4. Then, the object detection device can be a device having a configuration similar to that of the control device 3 illustrated in FIG. 2, for example. Note that the drive circuit 32 may be omitted. In this case, a model pattern representing a good product of the workpiece 10 is stored in the memory included in the object detection device. In this case, the processor of the object detection device may execute the processing of the feature extraction unit 41 and the processing of the comparison unit 42 on an image generated by the camera 4. Then, when the comparison unit 42 detects the workpiece 10 from the image generated by the camera 4 by comparison with the model pattern, the comparison unit 42 may determine that the workpiece 10 is a good product. On the other hand, when the comparison unit 42 cannot detect the workpiece 10 from an image, the comparison unit 42 may determine that the workpiece 10 located within an image capturing range of the camera 4 when the image is generated is a defective product. Then, the processor of the object detection device may display a good or bad determination result on a display device, or may notify a good or bad determination result to another apparatus connected via the communication interface.

According to the modified example, even when a position and a posture of an inspection target are not specified, the object detection device can determine whether the inspection target is good or bad.

Further, a computer program for executing processing of each of the units included in the processor 34 of the control device 3 may be provided in form of being recorded in a computer-readable portable recording medium, such as a semiconductor memory, a magnetic recording medium, or an optical recording medium.

All examples and conditional language recited herein are intended to have teaching purpose to aid the reader in understanding the concepts contributed by the inventor to the present invention and furthering the art, and are to be construed as being without limitation to such specifically recited examples and conditions nor does the organization of such examples in the specification related to showing of the superiority and inferiority of the invention. Although the embodiment of the present invention is described in detail, it is to be understood that various changes, substitutions, and modifications can be made hereto without departing from the spirit and scope of the invention.

What is claimed is:

1. An object detection device, comprising:
a memory configured to store a model pattern representing a plurality of predetermined features of a target object located in positions different from each other when the target object is viewed from a predetermined direction, and at least one partial region including a part of the model pattern; and
a processor configured to
extract the plurality of predetermined features from an image in which the target object is represented,
calculate an entire coincidence degree representing a coincidence degree between the plurality of predetermined features set for the entire model pattern and the plurality of predetermined features extracted from a region corresponding to the model pattern on the image while changing a relative positional relationship between the image and the model pattern,
calculate, for each at least one partial region, a partial coincidence degree representing a coincidence degree between one or more features included in the partial region among the plurality of predetermined features set for the entire model pattern and one or more of the predetermined features extracted from a region corresponding to the partial region on the image while changing the relative positional relationship, and
determine that the target object is represented in a region on the image corresponding to the model pattern when the entire coincidence degree is equal to or greater than a predetermined entire coincidence degree threshold value and the partial coincidence degree calculated for each at least one partial region is equal to or greater than a predetermined partial coincidence degree threshold value,
wherein
a type of at least one feature of the plurality of predetermined features used for calculating the partial coincidence degree is different from a type of at least one feature of the plurality of predetermined features used for calculating the entire coincidence degree, the at least one partial region comprises a plurality of partial regions set in the model pattern, and
the type of the at least one feature used for calculating the partial coincidence degree is different for each of the plurality of partial regions.

2. The object detection device according to claim 1, wherein
among the plurality of features, a feature included in a first partial region of the at least one partial region is a feature of a first type, and a feature that is not included in the first partial region is a feature of a second type different from the first type, and
the processor is further configured to
extract each of the feature of the first type and the feature of the second type from the image,
calculate the partial coincidence degree for the first partial region based on a coincidence degree between the feature of the first type and the feature of the first type extracted from a region corresponding to the first partial region on the image, and
calculate the entire coincidence degree based on a coincidence degree between the feature of the second type and the feature of the second type extracted from a region corresponding to the model pattern on the image.

3. The object detection device according to claim 2, wherein
the feature of the first type is a straight line, a predetermined curved line, or a figure having a predetermined shape, and the feature of the second type is a feature point.

4. The object detection device according to claim 1, wherein
the entire coincidence degree threshold value is higher than the partial coincidence degree threshold value.

5. The object detection device according to claim 1, wherein
the entire coincidence degree threshold value is lower than the partial coincidence degree threshold value.

6. The object detection device according to claim 1, wherein
the at least one feature used for calculating the entire coincidence degree includes a point on a contour of the target object, and
the at least one feature used for calculating the partial coincidence degree includes a shape, a straight line, or a curved line representing a characteristic portion of the target object.

7. The object detection device according to claim 1, wherein
the processor is configured to extract from the image, both (1) the at least one feature used for calculating the entire coincidence degree and (2) the at least one feature used for calculating the partial coincidence degree.

8. A non-transitory recording medium that stores an object detection computer program for causing a computer to execute:
extracting a plurality of predetermined features from an image in which a target object is represented;
calculating, while changing a relative positional relationship between the image and a model pattern representing the plurality of predetermined features of the target object located in positions different from each other when the target object is viewed from a predetermined direction, an entire coincidence degree representing a coincidence degree between the plurality of predetermined features set for the entire model pattern and the plurality of predetermined features extracted from a region corresponding to the model pattern on the image;

calculating, while changing the relative positional relationship, for each at least one partial region including a part of the model pattern, a partial coincidence degree representing a coincidence degree between one or more features included in the partial region among the plurality of predetermined features set for the model pattern and one or more of the predetermined features extracted from a region corresponding to the partial region on the image; and determining that the target object is represented in a region on the image corresponding to the model pattern when the entire coincidence degree is equal to or greater than a predetermined entire coincidence degree threshold value and the partial coincidence degree calculated for the at least one partial region is equal to or greater than a predetermined partial coincidence degree threshold value, wherein a type of at least one feature of the plurality of predetermined features used for calculating the partial coincidence degree is different from a type of at least one feature of the plurality of predetermined features used for calculating the entire coincidence degree, the at least one partial region comprises a plurality of partial regions set in the model pattern, and the type of the at least one feature used for calculating the partial coincidence degree is different for each of the plurality of partial regions.

* * * * *